United States Patent
Duggal et al.

(10) Patent No.: US 9,679,050 B2
(45) Date of Patent: Jun. 13, 2017

(54) METHOD AND APPARATUS FOR GENERATING THUMBNAILS

(71) Applicant: Adobe Systems Incorporated, San Jose, CA (US)

(72) Inventors: Ashish Duggal, Ashok Nagar (IN); Anmol Dhawan, Ghaziabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 332 days.

(21) Appl. No.: 14/266,152

(22) Filed: Apr. 30, 2014

(65) Prior Publication Data
US 2015/0317285 A1    Nov. 5, 2015

(51) Int. Cl.
G06F 3/048 (2013.01)
G06F 17/30 (2006.01)
G06F 17/21 (2006.01)
G06F 17/27 (2006.01)

(52) U.S. Cl.
CPC ...... G06F 17/30719 (2013.01); G06F 17/211 (2013.01); G06F 17/2785 (2013.01)

(58) Field of Classification Search
None
See application file for complete search history.

(56) References Cited

U.S. PATENT DOCUMENTS

| | | | | |
|---|---|---|---|---|
| 8,046,717 B1* | 10/2011 | Goel | ............ | G06Q 10/00 715/810 |
| 8,090,724 B1* | 1/2012 | Welch | ............ | G06F 17/30616 707/750 |
| 8,423,546 B2* | 4/2013 | Gherman | ............ | G06F 17/2715 707/736 |
| 2002/0191031 A1* | 12/2002 | Ricard | ............ | G06F 3/0481 715/838 |
| 2007/0112764 A1* | 5/2007 | Yih | ............ | G06F 17/241 |
| 2012/0076414 A1* | 3/2012 | Xu | ............ | G06F 17/30244 382/176 |
| 2012/0278341 A1* | 11/2012 | Ogilvy | ............ | G06Q 10/00 707/749 |
| 2015/0134638 A1* | 5/2015 | Grosman | ............ | G06F 17/30041 707/722 |

* cited by examiner

Primary Examiner — Mahelet Shiberou
(74) Attorney, Agent, or Firm — Keller Jolley Preece

(57) ABSTRACT

A method for generating thumbnail is provided. In one embodiment, a summary of a first document is generated. The summary includes a first asset (e.g. words, images or sentences). The first document is a first source. The first asset is used to obtain a second asset (e.g. words, images or sentences) from a second source. A thumbnail of the first document is generated using the first asset and the second asset. An apparatus for substantially performing the method as described herein is also provided.

20 Claims, 14 Drawing Sheets

FIGURE 8A

REPORT CARD

Class 9 A

Session: 2011-2012

Student Profile
Name of Student          ANMOL DHAWAN
Admission Number         200800123
Date of Birth            16/11/1997
Residential Address        Amarpali, Indirapuram, Ghaziabad, U.P.

Board Registration No.     XYZ
Mother's Name           I K Rani
Father's Name           K L Dhawan Academic Performance:

| SUBJECT | GRADE |
|---------|-------|
| Math | A+ |
| English | A+ |
| Science | B |
| History | A |
| Attendance | A |

REPORT CARD

Class 9 A

Session: 2011-2012

Student Profile
Name of Student          ASHISH DUGGAL
Admission Number         200800122
Date of Birth            6/12/1997
Residential Address & Telephone No.   59/6, Second Floor, Ashok Nagar
                         Delhi - 110018

Board Registration No.   XYZ
Mother's Name            Asha Rani
Father's Name            J K Duggal Academic Performance:

| SUBJECT | GRADE |
|---|---|
| Math | A+ |
| English | A+ |
| Science | B+ |
| History | A- |
| Attendance | A | ns
METHOD AND APPARATUS FOR GENERATING THUMBNAILS

BACKGROUND

As the world is moving towards paperless exchange of information, use of documents and document repositories including such documents is on the rise. Currently, thumbnail of a document does not convey human-readable information about the specifics of the document unless a user of the document clicks the thumbnail to open the document. Further, in case of similar type of documents the thumbnails are similar looking and do not convey any meaningful information to users. Hence, a user of a document repository has to access each document, individually, to obtain the specifics of each document. The situation worsens in cases in which the documents are text-heavy documents and do not include any images. Therefore, there is a need for improved way of generating thumbnails.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for generating thumbnail is provided. In one embodiment, a summary of a first document is generated. The summary includes a first asset (e.g. words, images or sentences). The first document is a first source. The first asset is used to obtain a second asset (e.g. words, images or sentences) from a second source. A thumbnail of the first document is generated using the first asset and the second asset.

In another embodiment, a first asset (e.g. words, images or sentences) of a first document is identified. The first document is a first source. The first document is used to obtain a second asset (e.g. words, images or sentences) from a second source. A thumbnail of the first document is generated using the first asset and the second asset.

An apparatus for substantially performing the method as described herein is also provided.

BRIEF DESCRIPTION OF THE DRAWINGS

FIG. 8A and FIG. 8B are diagrams illustrating generation of thumbnail of a document, according to one or more embodiments;

While the procedure and apparatus is described herein by way of example for several embodiments and illustrative drawings, those skilled in the art will recognize that the procedure and apparatus for generating thumbnails is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the procedure and apparatus for generating thumbnails. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview

Figure 1:
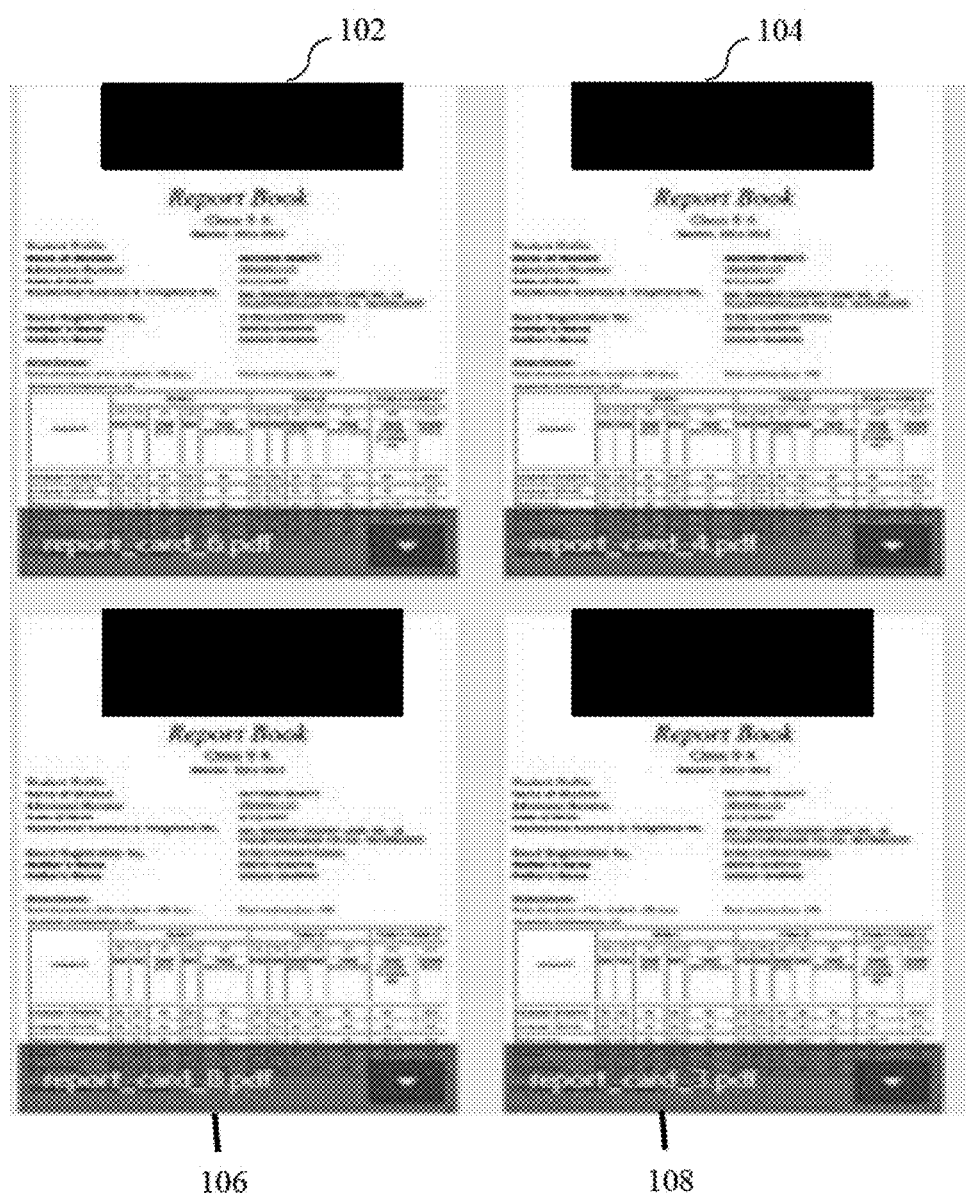
FIG. 1 is a diagram of thumbnails of documents of a document repository, according to prior art.

One prior procedure for generating thumbnails of documents in a document repository includes reducing size of a page, for example a first page, of each document. For each document, the page with reduced size is then used as a thumbnail for that document. FIG. 1 is a diagram indicating four thumbnails, i.e. thumbnails 102, 104, 106, and 108, of the four documents in the document repository, generated using the prior procedure. The thumbnails fail to provide meaningful information about the specifics of the documents. In addition, in FIG. 1, each thumbnail also does not provide any summary of their respective documents. Hence, a user of the document repository has to access each document, individually, to obtain the specifics of each document. Also, since the thumbnail is a mere reduced size of the page the visibility is hampered. Further, it would be more desirable to associate text-heavy document with relevant images. Therefore, there is a need for improved way of generating thumbnails.

In accordance to embodiments of the present invention and as will be described in more detail below, a method for generating thumbnails of documents is provided. A summary of a first document is generated. Various existing techniques, and also as described later, can be used to generate the summary of the first document. The summary includes a first asset (e.g. words, images or sentences). The first document is a first source. The first asset is used to obtain a second asset (e.g. words, images or sentences) from a second source. Various existing ways of obtaining the second asset can be used, for example keyword criteria based search, phrase criteria based search, image criteria based search etc. Assets, from the second source, that match search criteria are determined as the second asset (e.g. images). A thumbnail of the first document is then generated using the first asset and the second asset.

A document is an electronic content that includes one or more assets. Examples of the document include, but are not limited to, Portable document format (PDF) document, Word document, Notepad, PowerPoint presentation, Excel document etc. The document can include one page or multiple pages.

An asset indicates or represents content of the document. Examples of the assets include, but are not limited to, text, videos, images, graphs, tables etc.

A gist or summary of the document includes central meaning or theme of the document. The summary indicates essential part of the document. The summary can include one or more categories of the document. For example, the document including a report card has the category of "report card". The document including details of a product has the category of a "product manual". The summary includes a first asset. The first asset refers to one or more assets that represent a gist or are indicative of a summary of the first document. The first asset is identified using various techniques as described later.

A thumbnail is a graphical representation of the document. The thumbnail is an image, a combination of one or more images, a combination of text or one or more images, or a combination of one or more assets.

A document analysis engine is an engine that includes one or more engines for parsing the document and extracting meaningful information, such as assets, from the document. Examples of the document analysis engine include, but are not limited to, text classification engine, ontology engine, natural language processing engine, and a combination of one or more engines. Ontology includes a hierarchical graph structure for representing knowledge or the assets.

A source is an online document repository or a folder on a hard drive, or any other storage drive or device.

A first document (hereinafter also referred to as a first source) is present in a document repository. The document repository (e.g. Acrobat.com or Adobe Creative Cloud) includes one or more documents (e.g. a first document). The first document of the document repository is accessed and parsed electronically by an electronic device, such as a server, hosting the document repository. The first document is parsed using a document analysis engine of the server.

The document analysis engine is a combination of one or more engines, for example text classification engine and ontology engine etc. Assets (e.g. words, images or sentences) of the first document are identified by the document analysis engine. Assets of the first document include a first asset. The first asset refers to one or more assets that represent a gist or are indicative of a summary of the first document. For example, if the first document is a report card then the first asset indicative of the summary of the first document includes "report card", different subjects such as "mathematics", "science", "arts", "English" etc., grades obtained in the different subjects, class of the student, name of the student etc. The first asset can also include images, if any, present in the first document. For example, the first asset can include an image of the student and an image of the logo of the school or university. The first asset is identified using various technologies. In one example, the words or sentences that have a frequency of occurrence greater than a predefined number, in the first document, are determined as the words or sentences indicative of the summary of the first document. The images present in predefined proximity to the determined words or sentences, in the first document, are determined as the images indicative of the summary of the first document. Various existing technologies can be used to determine the assets indicative of the summary of the first document.

Weights are assigned to the determined assets by the document analysis engine based on various parameters (e.g. frequency of occurrence of the words or sentences, proximity of the images to the words etc.). Higher weight indicates higher relevance of the asset to the summary of the first document. The assets having weights greater than a threshold are then identified and referred to as the first asset. One or more assets can have weights greater than the threshold and hence, the first asset includes one or more assets. The threshold is a configurable parameter and can be predefined or can be based on rules. For example, the threshold can be configured to include at least five assets. Hence, the top five ranked assets based on the weights are identified as the first asset. The first asset indicates or represents the summary of the first document and is also referred to as the summary of the first document, in some embodiments.

A second asset related to the first document is then obtained from a second source. In one embodiment, examples of the second source include, but are not limited to, a public document repository, a private document repository, the document repository in which the first document is present, a second document present in the document repository in which the first document is present but has a type different than the first document, a public portal, a private portal, a social networking portal or website, or any other publicly or privately available source of content. Examples of the similar types of the documents include, but are not limited to, two report cards, two credit card bills etc. The similarity can be determined based on various existing techniques that provide similarity scores or various other techniques for determining similarity. If the similarity score or the similarity is within a desired range then the documents are of similar types. Two documents that are not of similar types are different types of documents.

A search is performed in the second source using the assets of the first document. In one scenario, one or more assets of the first document are used to perform the search while in other scenario, the first asset is used to perform the search. Various existing ways of performing the search can be used, for example keyword criteria based search, phrase criteria based search, image criteria based search etc. Assets, from the second source, that match search criteria are determined as the second asset (e.g. images). The second asset is related to the first document because the second asset matches the search criteria which in turn is based on the first document. For example, an image (the second asset) of the student is searched using the name (the first asset or asset of the first document or search criteria) of the student, if the image of the student includes the name of the student as metadata. In one scenario, the images that are searched based on the assets of the first document carry weights similar to the respective assets used for searching. For example, if the weight of name of the student is W1 then the weight of the image of the student is also assigned the weight W1. The same weight assignment can be used in scenarios in which a search is performed based on the first asset. In another scenario, the weight of the image of the student can be K*W1, where K is a configurable factor based on requirement.

The first asset and the second asset are used to generate a thumbnail of the first document. For generating the thumbnail, size of the thumbnail is determined. Sub-sizes within the thumbnail are then allocated to the first asset and the second asset based on the weights of the first asset and the second asset. For example, if the size of the thumbnail is N*N and two relevant assets are identified with weights (e.g. 49 and 51) greater than the threshold (e.g. 48), then each asset is allocated a sub-size of [(N*N)*weight of the asset]/[100]. The threshold also depends on the size of the thumbnail and can be varied based on the size of the thumbnail. For example, bigger size thumbnail for a desktop can be made to include eight assets while lower size thumbnail for a mobile phone can be made to include three assets by varying the threshold.

The generated thumbnail is then displayed to a user accessing the document repository.

In some embodiments, duplicities are removed before generating the thumbnail. For example, if an asset A1 of the first asset is used to determine asset B1 of the second asset from the second source then asset A1 is not included in the thumbnail. Instead assets A2 and other assets of the first asset along with asset B1 of the second asset are used to generate the thumbnail. Typically, images are used as images are worth thousand words. Else, settings can be configured to indicate what type of assets should be preferred over what other assets.

In another embodiment, the second source is the second document of a type similar to the first document. The second document can be included in the same document repository which includes the first document. The additional processing of the first document and the second document is performed and is now described. The document analysis engine also obtains assets indicative of summary of the second document. In one example, the document analysis engine accesses the second document and processes the second document to determine the assets. The processing of the second document is performed in a similar way as the processing of the first document. In another example, the assets are fetched or obtained from the document repository, if the assets are already present and stored in the document repository. The document analysis engine further identifies the assets that are common between the first document and the second document. In one example, all assets that are common between the first document and the second document are identified. The weights of the assets of the first document, that are common between the first document and the second document, are reduced. The assets having weights, after reduction, greater than the threshold are used in generating the thumbnail. In another example, the weights for the images, of the first document, that are common between the first document and the second document are not reduced. Only the weights of the assets other than the images are reduced if such assets are common between the first document and the second document. The assets having weights, after reduction, and the images having weights, without reduction, greater than the threshold are identified as the first asset and used in generating the thumbnail. Similarly, weights of assets of the second document are altered and the assets having weights greater than the threshold are identified as the second asset. The second asset after such a processing can include zero or more assets.

The thumbnails, generated by using the assets that meet the threshold, convey the specifics of the documents. FIG. 8C is a diagram indicating four thumbnails, i.e. thumbnails 804, 806, 808, and 810, of the four documents in the document repository, generated in accordance with one or more embodiments of the invention. The thumbnails provide information about the specifics of the documents. In addition, in FIG. 8C, each thumbnail looks different and conveys meaningful information. Hence, the user of the document repository need not access each document, individually, to obtain the specifics of each document. The specifics are visible from the thumbnails itself. Also, the visibility of the thumbnails is good because the assets are included in the thumbnails based on the size of the thumbnails.

TERMS DEFINITIONS

A document is an electronic content that includes one or more assets. Examples of the document include, but are not limited to, Portable document format (PDF) document, Word document, Notepad, PowerPoint presentation, Excel document etc. The document can include one page or multiple pages. An asset indicates or represents content of the document. Examples of the assets include, but are not limited to, text, videos, images, graphs, tables etc. In one example, the document includes only text. In another example, the document includes text and image, and is referred to as a text document. In yet another example, the document includes text and any other form of asset. In still another example, the document includes no text but only images. In still another example, the document includes no text but any other form of asset. In still another example, the document is not a video.

A gist or summary of the document includes central meaning or theme of the document. The summary indicates essential part of the document. The summary can include one or more categories of the document. For example, the document including a report card has the category of "report card". The document including details of a product has the category of a "product manual".

Weights include a score on a scale of 1 to 100 or on any other normalized scale. The weight indicates relevance of the asset to the document or to the gist of the document. The weights also indicate priority of the asset to be included in a thumbnail.

A thumbnail is a graphical representation of the document. The thumbnail is an image, a combination of one or more images, a combination of text or one or more images, or a combination of one or more assets.

A document repository is a collection of one or more documents. The document repository can be a database. The document repository can be a cloud service or any other service via which a user can access one or more documents. Examples of the document repository includes, but are not limited to, Acrobat.com, SharePoint, Adobe Creative Cloud, Adobe Marketing Cloud, Adobe Revel Cloud, iCloud etc. The document repository can be a folder on a hard drive, or any other storage drive or device. The document repository can be an offline or online repository.

A server is an electronic device that accesses the document for performing various operations. Examples of the server includes, but are not limited to, computing devices, processing devices, or any other device including one or more processors for processing the document. Examples of the operations include, parsing the document, determining gist of the document, determining assets of the document, obtaining assets of the document, identifying assets that are common among documents, assigning weights to the assets, altering weights of the assets, generating thumbnails, determining size of the thumbnails, allocating sub-sizes of the thumbnails, searching images, using the assets etc.

A document analysis engine is an engine that includes one or more engines for parsing the document and extracting meaningful information, such as assets, from the document. Examples of the document analysis engine include, but are not limited to, text classification engine, ontology engine, natural language processing engine, and a combination of one or more engines. Ontology includes a hierarchical graph structure for representing knowledge or the assets.

A user is any person or entity that has access to the document or to the document repository. The user is also referred to as a visitor.

A first source is an online document repository or a folder on a hard drive, or any other storage drive or device. In some embodiments, the first source is the first document.

In one embodiment, examples of the second source include, but are not limited to, a public document repository, a private document repository, the document repository in which the first document is present, a second document present in the document repository in which the first document is present but has a type different than the first document, a public portal, a private portal, a social networking portal or website, or any other publicly or privately available source of content. In another embodiment, the second source is the second document of a type similar to the first document. The second document can be included in the same document repository which includes the first document.

In the following discussion, an example environment is first described that is operable to employ techniques described herein. Following this, a section entitled "Example Procedures" describes some example procedures for generating thumbnails in accordance with one or more embodiments. Finally, a section entitled "Example Snapshots" indicates generating thumbnails in accordance with one or more embodiments.

Example Environment

Figure 2:
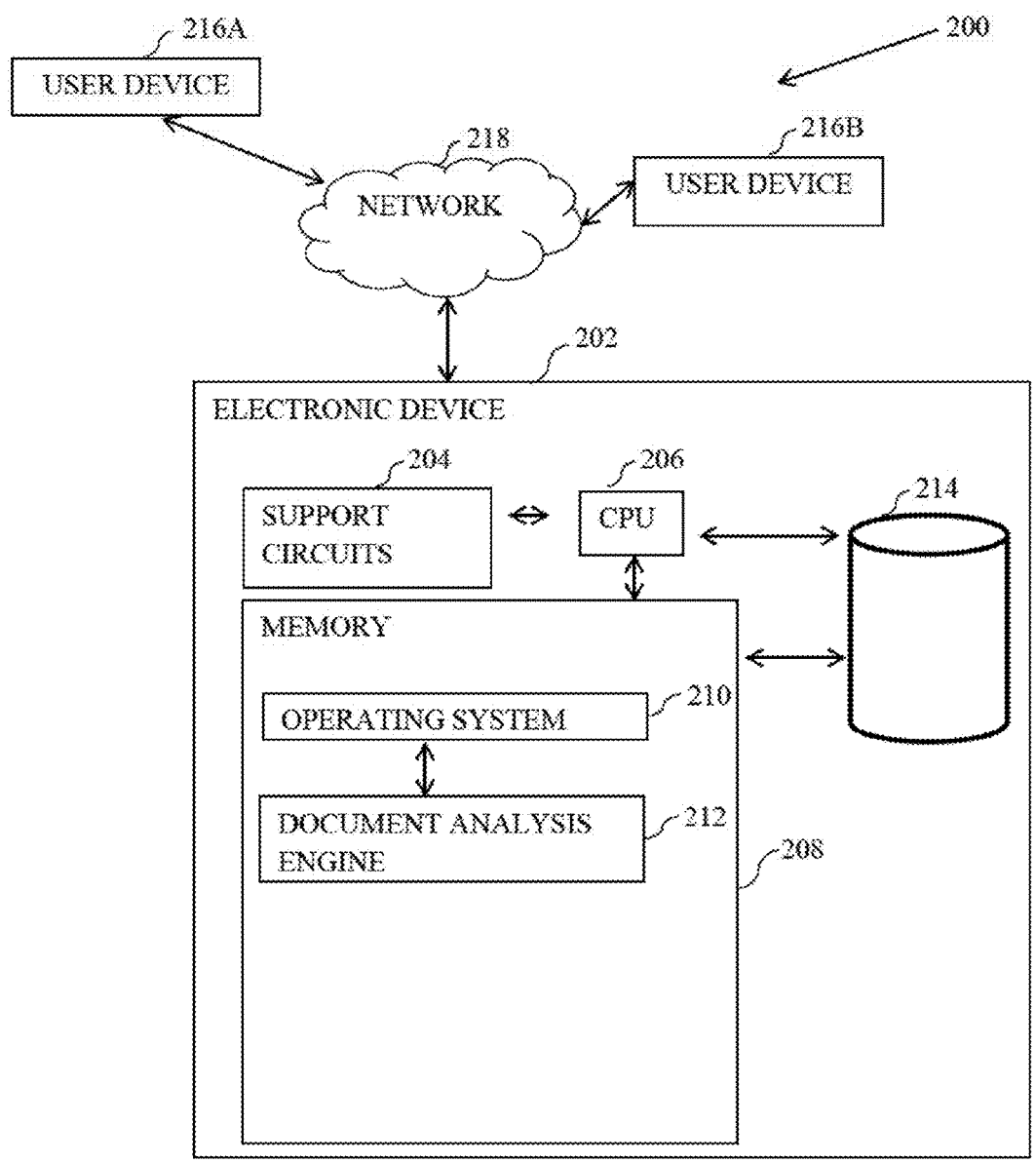
FIG. 2 is diagram of an environment for generating thumbnails, according to one or more embodiments.

FIG. 2 is a diagram of an environment 200 for generating thumbnails, according to one or more embodiments. The environment 200 includes one or more user devices, such as a user device 216A and a user device 216B. The user devices can communicate with an apparatus 202 via a network 218.

Examples of the user devices include, but are not limited to, a desktop computer, a smartphone, a tablet computer, a laptop computer, a mobile computer or any other electronic device having one or more processors.

Examples of the network 218 include, but are not limited to, internet, local area network (LAN), wireless area network, wired area network etc.

Examples of the apparatus 202 include, but are not limited to, a desktop computer, server, a combination of one or more servers, or any other electronic device having one or more processors. The apparatus 202 can be present at one single location or can be present in a distributed environment at different locations.

The apparatus 202 includes a Central Processing Unit (CPU) 204, support circuits 206, and a memory 208. The CPU 204 may include one or more commercially available microprocessors or microcontrollers that facilitate data processing and storage. The various support circuits 206 facilitate the operation of the CPU 204 and include one or more clock circuits, power supplies, cache, input/output circuits, and the like. The memory 208 may include at least one of Read Only Memory (ROM), Random Access Memory (RAM), disk drive storage, optical storage, removable storage or the like. The memory 208 includes an operating system 210, and a document analysis engine 212. The operating system 210 may include various commercially known operating systems. Examples of the document analysis engine 212 include, but are not limited to, word processing application, document processing application etc.

The apparatus 202 may further include one or more input devices (not shown in FIG. 2) connected to the apparatus 202. Examples of the one or more input devices include, but are not limited to, peripheral devices, keyboard, mouse etc. In some embodiments, the apparatus 202 may not be connected to the input devices separately and may have functionalities of these input devices built into the apparatus 202. For example, in cases in which the apparatus 202 is touch enabled device, gesture enabled device, or paired to such similar devices that act as the input devices.

The apparatus 202 further includes a storage device 214. The storage device 214, for example a memory or a storage drive, includes the plurality of documents of the document repository. The document repository includes a database of documents. The apparatus 202 can provide access to the documents stored in the storage device 214 in various ways. For example, the access can be provided via a cloud service, for example Acrobat.com, SharePoint, Adobe Creative Cloud, Adobe Marketing Cloud, Adobe Revel Cloud, iCloud etc.

The document analysis engine 212 can also be provided as a part of the cloud service or as a standalone service that receives documents and provides thumbnails for the documents. The document analysis engine 212 can be implemented in various ways, for example as a plugin, as a web service, as a part of a desktop, mobile or any other software application etc. The document analysis engine 212 accesses the documents from the storage device 214 and generates thumbnails for the documents. The document analysis engine 212 includes one or more engines for processing the documents. The document analysis engine 212 parses the documents, for example a first document.

In one embodiment, the document analysis engine 212 determines assets (e.g. words, images or sentences) of the first document. Weights are assigned to the determined assets by the document analysis engine 112 based on various parameters (e.g. frequency of occurrence of the words or sentences, proximity of the images to the words etc.). The assets having weights greater than a threshold are then identified and referred to as the first asset. One or more assets can have weights greater than the threshold and hence, the first asset includes one or more assets.

A second asset related to the first document is then obtained from a second source by the document analysis engine 112. In one scenario, examples of the second source include, but are not limited to, a public document repository, a private document repository, the document repository in which the first document is present, a second document present in the document repository in which the first document is present but has a type different than the first document, a public portal, a private portal, a social networking portal or website, or any other publicly or privately available source of content. The second source is accessible via the network 218 or using the storage 214.

The document analysis engine 112 performs a search in the second source using the assets or the first asset of the first document. Assets, from the second source, that are identified as a result of the search are determined as the second asset (e.g. images). The second asset is also assigned weight by the document analysis engine 112 based on the asset or assets of the first document that resulted in identification of the second asset. For example, the weight of the second asset can be similar to the weight of a corresponding asset of the first document or can be a weighted average of the weights of the corresponding assets of the first document or can be a value obtained by multiplying a factor by the weight of the corresponding asset of the first document. The corresponding asset or the corresponding assets includes the assets that form the search criteria and result in identification of the second asset.

The first asset and the second asset are used to generate a thumbnail of the first document. The generated thumbnail is then displayed to a user accessing the document repository.

In some embodiments, the document analysis engine 112 removes duplicities before generating the thumbnail. For example, if an asset A1 of the first asset is used to determine asset B1 of the second asset from the second source then asset A1 is not included in the thumbnail. Instead assets A2 and other assets of the first asset along with asset B1 of the second asset are used to generate the thumbnail. Typically, images are used as images are worth thousand words.

In another embodiment, the documents analysis engine 212 determines assets of the first document and assigns weights to the assets. If there is more than one document then, in some embodiments, the documents analysis engine 212 identifies assets of one or more other documents in a manner similar to that of the first document. In one scenario, assets for each document can be pre-processed and stored in the storage device 214 along with the document to be obtained or accessed as per the need. In another scenario, the document can be accessed in real time to identify the assets. The assets that are common among the other documents and the first document are identified. The weights of the assets that are present in the first document and also in the other documents are altered. In one example, altering the weight includes reducing the weight. The assets of the first document having weights greater than a threshold are then included in the thumbnail of the first document. The document analysis engine 212 also determines a size of the thumbnail. Based on the size of the thumbnail and weights of the assets, allocation of portions, i.e. sub-sizes, within the thumbnail to different assets is performed. A reduced size of the asset is then fitted into the allocated portion to generate the thumbnail of the first document. In a similar manner, thumbnails for one or more other documents are generated. The generated thumbnails are then stored in the storage device 214. The thumbnails are displayed to a user of the cloud service.

In illustrated example, the user maintains an account with the cloud service. The user uses the cloud service for storing and managing the documents. The user accesses the cloud service via the user device 216A. Once the user logs into the cloud service, a display of the thumbnails of the documents present in the account of the user is provided. The thumbnails are fetched from the storage device 214 by the cloud service and rendered on the user device 216A. In one scenario, the documents can be pre-processed to generate and store the thumbnails to enable smooth and quick rendering. In another scenario, the document can be processed in real time to generate the thumbnails.

In some embodiments, the assets that are identified from the first document may just include text. In such scenario, a search is performed in the storage 214 to identify images that are tagged with the identified text or with portions of the text. The identified images are then included in the thumbnail for the first document.

The algorithms and procedures for performing various operations of the document analysis engine 212 and the apparatus 202 is now explained in conjunction with example procedures. Such procedures need to be performed in various scenarios. In one scenario, a user opens an account with an online web service. The user maintains some data in the account. The data can be in form of documents. With time the number of documents in the account increases. Hence, the procedures described herein can be used to provide thumbnails to the user to enable easy navigation through the documents. In another scenario, the thumbnails can be generated and provided for documents present within a folder on the user device. The procedures can be performed at any point of time, i.e. in real time when thumbnails need to be rendered, or any other time as and when the documents are accessible.

Example Procedures

Figure 3:
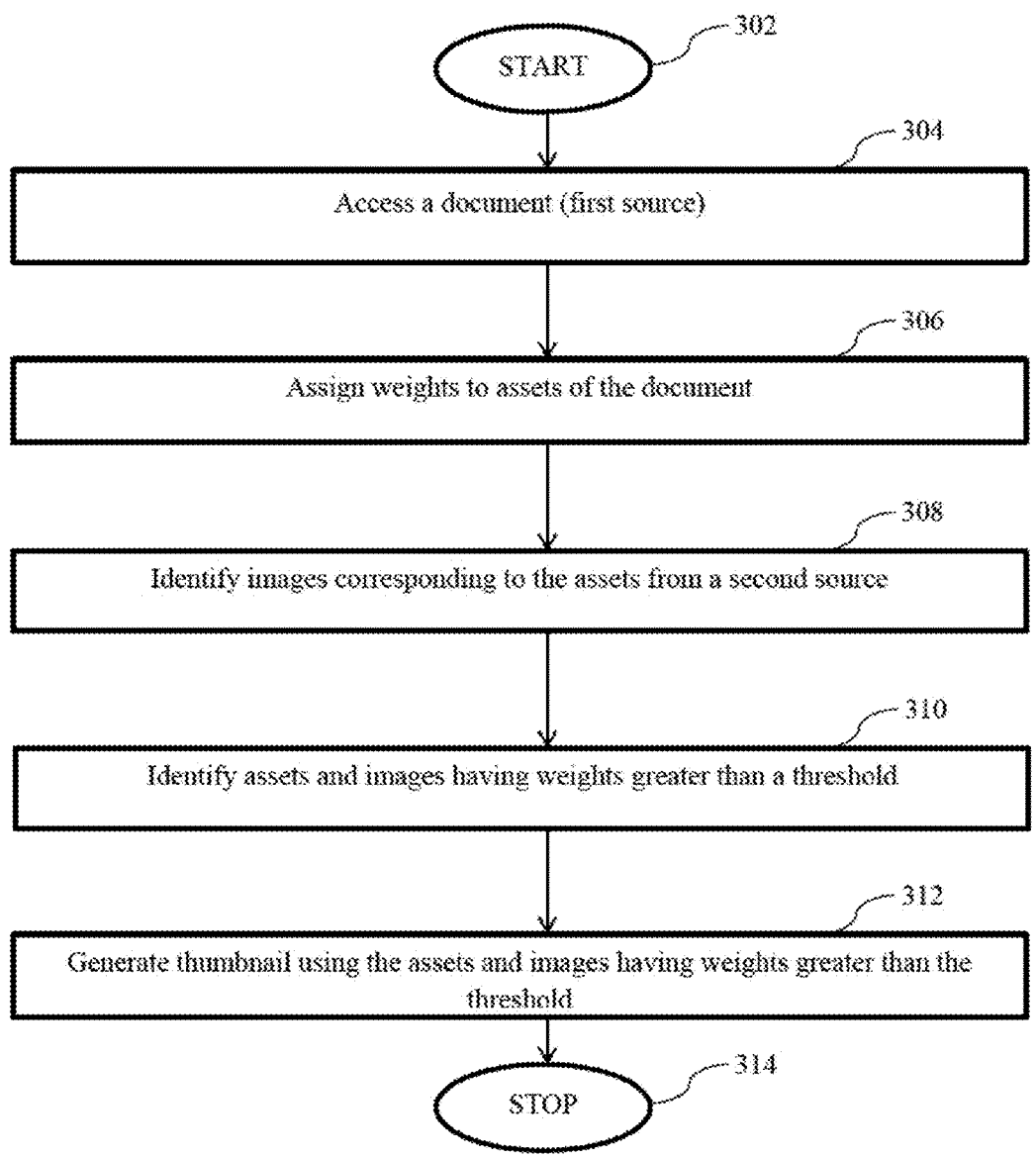
FIG. 3 is a flowchart of a procedure for generating a thumbnail of a document, according to one or more embodiments.

FIG. 3 is a flowchart of a procedure 300 for generating thumbnail of a document by an electronic device, for example the apparatus 202 of FIG. 1, according to one embodiment. In illustrated embodiment, the document does not include any image but other assets, for example text.

The procedure starts at step 302 and proceeds to step 304.

At step 304, the document (first source) is accessed.

At step 306, the document is processed to extract words, phrases, or sentences (hereinafter referred to as the words to include words, phrases or sentences individually or in combination) from the document and to assign weights to the extracted words. Various existing technologies can be used to extract the words and assign the weights. The extraction is based on various parameters, for example frequency of occurrence of the words, position of occurrence of the words, context of the word, relevance of the word to the words nearby or in proximity of the words, sematic analysis, natural language processing, ontology based processing etc. One technique for assigning weights or extracting words or summary include technique described in U.S. Pat. No. 7,873,640, titled "SEMANTIC ANALYSIS DOCUMENTS TO RANK TERMS", assigned to the same assignee Adobe Systems Incorporated, and which is herein incorporated by reference in its entirety. Another technique for assigning the weights or extracting words or summary include technique described in U.S. Pat. No. 8,090,724, titled "DOCUMENT ANALYSIS AND MULTI-WORD TERM DETECTOR", assigned to the same assignee Adobe Systems Incorporated, and which is herein incorporated by reference in its entirety. It is to be understood that the technologies incorporated herein by reference are mere examples of assigning weights to the assets and any other technology can be used for assigning the weights to the words.

The identified or extracted words are indicative of the summary of the document. In various embodiments, the summary can be based on a predefined number of words. For example, a default setting indicating usage of top five words of the document for extracting the summary can be set. The top five words include the five words with highest weights.

In some embodiments, at step 308, a second source (i.e. a document repository of a user or any other publically available document repository or any other available document repository, e.g. hard drive or other storage) is accessed to identify images corresponding to the identified words. Various existing technologies for identifying images can be used. For example, images tagged with words matching one or more of the identified words can be identified. Natural language based processing or optical character recognition technology can be used to identify tags for the images if the images do not have metadata including words or do not have any tags or words associated with the images. In one embodiment, the words having weights greater than a threshold are used to identify images. In another embodiment, a default number of top words, i.e. most occurring words, are used to identify images. In yet another embodiment, all the words can be used to enable exhaustive identification.

At step 310, the words and images having weights greater than the threshold are identified. In one embodiment, an image is assigned a weight equivalent to a word using which the image was identified. If a group of words was used to identify the image then the weights of the words are averaged to assign the weight to the image. In another embodiment, based on requirement, the weight to the image can be assigned as beta*weight of the word using which the image was identified. Beta can be assigned a numerical value based on the requirement. For example, image is a better way of representing a thumbnail and hence, to ensure that the image receives a weight higher than that of the words beta can be assigned a value greater than 1. Similarly, if the image is not desired then beta can be set to a value less than 1.

At step 312, a thumbnail including the words and images having weights greater than the threshold is generated. In one embodiment, in which step 308 is not performed, the words having weights greater than the threshold is generated. In another embodiment, in which step 308 is performed, the words and the images having weights greater than the threshold is generated. A size of the thumbnail is identified. The size can include a predefined size based on type of user devices, for example desktop computer, smartphone etc. The size has a dimension M*N, where M is the length of the thumbnail and N is the width of the thumbnail where M and N varies based on the type of user device. In some embodiments, M is equal to N. The threshold can be varied based on size of the thumbnail. For example, if the thumbnail for desktop computer is generated then threshold can be kept low to include five words and images in total. If the thumbnail for mobile phone is generated then threshold is kept high to include two words and images in total. Based on the number of words and images having weights greater than the threshold, portions of the thumbnail are allocated to the words and images. For example, if K relevant words and images having weights greater than threshold are identified then every image and word is allocated a portion with sub-size of (M*N)*(corresponding weight of the image or the word)/100 such that the sum of weights of K images and words is equal to 100.

In one embodiment, various thumbnails for various sizes, based on type of devices, is generated and stored for the document. The stored thumbnails are rendered when required, for example when a user accesses a folder or a web service including the document. In another embodiment, the thumbnail is generated in real time when a request to render the thumbnail is received. In yet another embodiment, an intermediate approach can be used. For example, some steps can be performed and their outputs can be stored to enable quick processing while some steps can be performed in real time. The thumbnail can include only words of the document, the images and the words, or only the images based on the weights and the threshold.

In some embodiments, the thumbnail includes assets corresponding to at least two pages of the document.

The procedure stops at step 314.

Figure 4:
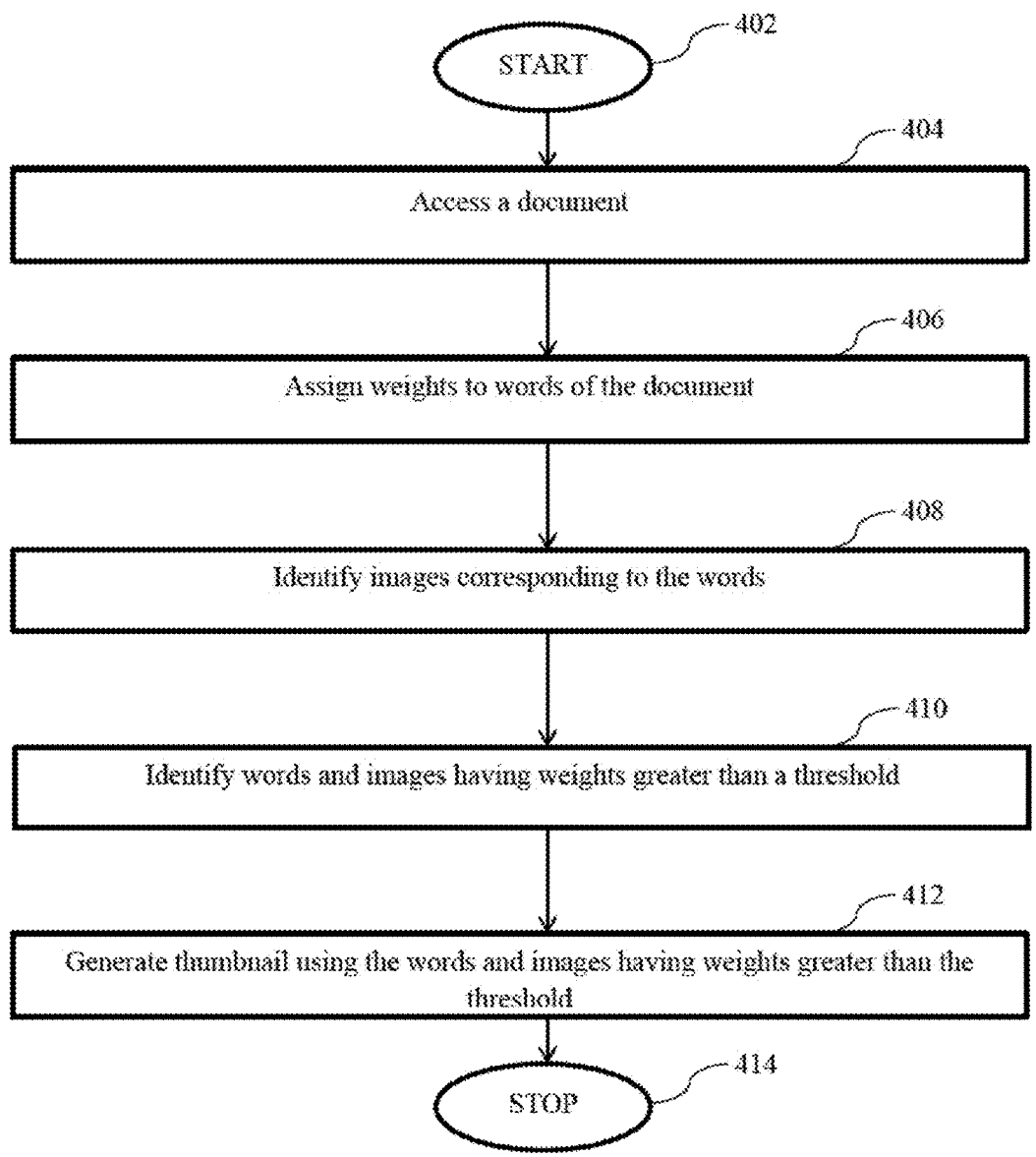
FIG. 4 is a flowchart of a procedure for generating a thumbnail of a document, according to one or more embodiments.

FIG. 4 is a flowchart of a procedure 400 for generating thumbnail of a document by an electronic device, for example the apparatus 202 of FIG. 1, according to one embodiment. In illustrated embodiment, the document includes images and words among other assets.

The procedure starts at step 402 and proceeds to step 404.

At step 404, the document is accessed.

At step 406, the document is processed to extract words, phrases, or sentences (hereinafter referred to as the words to include words, phrases or sentences individually or in combination) from the document and to assign weights to the extracted words. Various existing technologies can be used to extract the words and assign the weights.

At step 408, images corresponding to extracted words are identified. In one embodiment, the images present within the document are identified. The word or the words in predefined proximity to an image are identified and the weight assigned to the word or average value of the weights assigned to the words is assigned as the weight to the image. The same process is performed for one or more images in the document. In another embodiment, a reverse approach is adopted. A check is performed to determine if any image is present in the predefined proximity to the word or the words. If yes then the weight of the word or the average value of the weights of the words is assigned to the image. Since the number of words may be large, a default number of top words from the document or the words that have weight greater than the threshold can be considered for identifying one or more images. Various existing technologies for identifying images can also be used. For example, if the image has some words associated with it in the metadata of the image and the words match any of the word or the words in the document then the image can be identified and corresponding weight can be assigned. Natural language based processing or optical character recognition technology can be used to identify words for the images if the images do not have any words associated with the images or metadata including the words.

In some embodiments, optionally, search for the images can also be performed in the document repository of the user or any other publically available document repository or any other available document repository, e.g. hard drive or other storage, to identify images corresponding to the identified words. Various existing technologies for identifying the images can be used. Various ways, as also described in FIG. 3, can be used for assigning weights to the images.

At step 410, the words and the images having weights greater than the threshold are identified.

At step 412, the thumbnail including the words and the images having weights greater than the threshold is generated. Various ways, as also described in FIG. 3, can be used for generating the thumbnail, storing the thumbnail and rendering the thumbnail.

In some embodiments, the thumbnail includes assets corresponding to at least two pages of the document.

The procedure stops at step 414.

Figure 5:
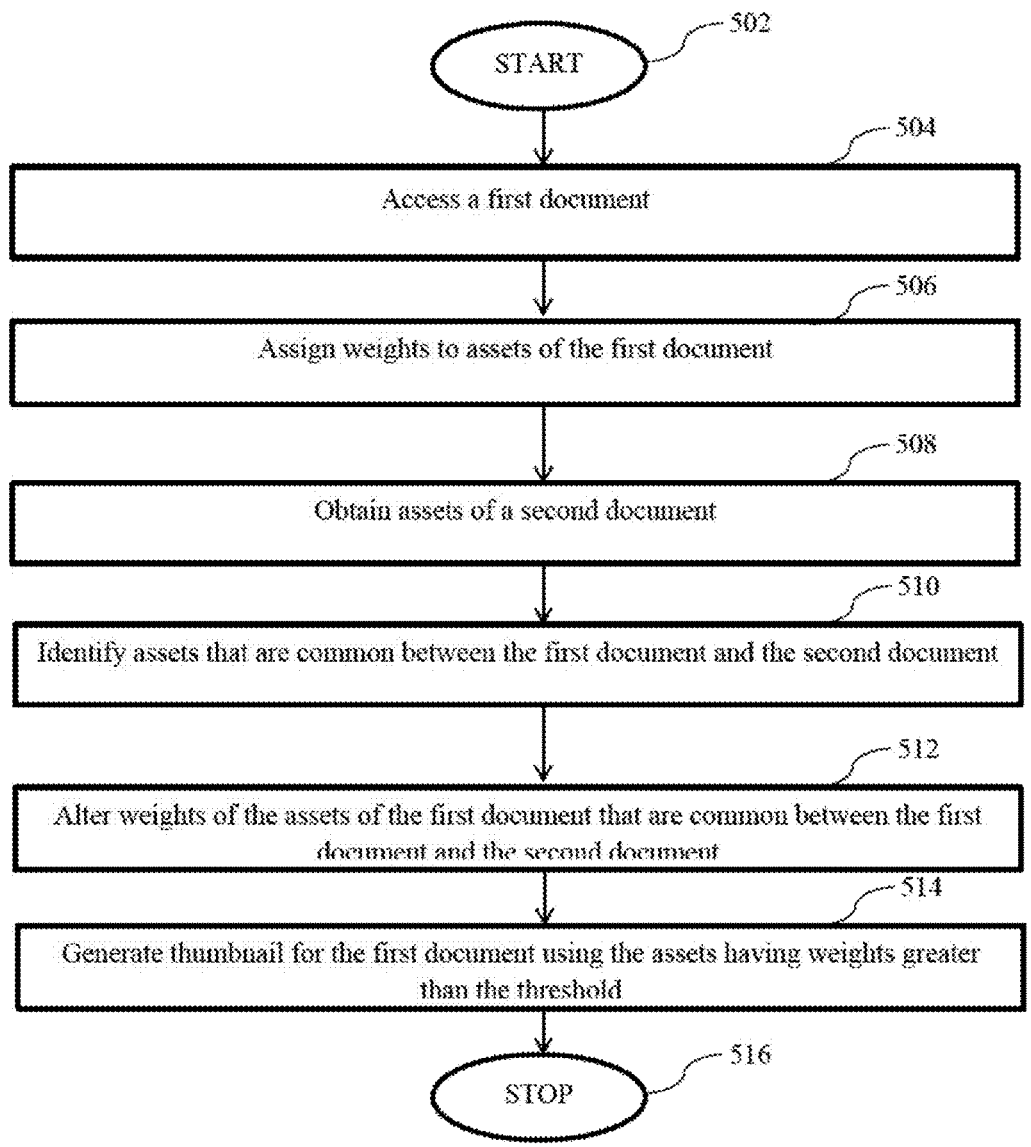
FIG. 5 is a flowchart of a procedure for generating thumbnails of documents in a document repository, according to one or more embodiments.

FIG. 5 is a flowchart of a procedure for generating thumbnails of documents in a document repository, according to one or more embodiments.

The procedure starts at step 502 and proceeds to step 504.

At step 504, a document, for example a first document, is accessed. The first document can be any document as described herein and includes assets. The first document can include words or images or any other assets.

At step 506, the first document is processed to extract assets from the first document and to assign weights to the extracted assets. Various existing technologies, as described herein, can be used to extract the assets and assign the weights. In some embodiments, the extracted assets are used to extract further assets from any available document repository. The further assets are then included in the extracted assets.

At step 508, assets of a second document are obtained. A check is performed to determine if there are any other documents present in the document repository. In illustrated embodiment, presence of the second document is determined. The assets of the second document are obtained in a way similar to that of the first document. In one embodiment, the second document is processed as and when needed, i.e. when presence of the second document is determined. In another embodiment, the second document is pre-processed and the assets of the second documents are identified and stored. The stored assets are then accessed and used to improve the processing speed.

At step 510, assets that are common between the first document and the second document are identified. Various existing techniques can be used to compare the assets of the first document and the assets of the second document. The assets that match with each other are identified as the assets that are common between the first document and the second document. In one embodiment, existing techniques that provide exact match are used. In another embodiment, existing techniques that provide an approximate match, i.e. match within predefined threshold are used. Various existing techniques, for example word to word similarity, phrase to phrase similarity, image to image similarity, word to image similarity etc. can be used. The assets that are common between the first document and the second document are then stored.

In some embodiments, a check is further performed to determine if there are any other documents present in the document repository. If any other document is found then step 508 and step 510 are performed to identify assets that are common among the first document, the second document, and any other document. The checking continues till all documents in the document repository are processed. Alternatively, if a predefined number, i.e. maximum or minimum, number of documents needs to be processed then the check is performed till the predefined number is met.

At step 512, weights of the assets of the first document that are common between the first document and the second document are altered. If there are more documents then the weights of the assets that are common among various documents are also altered. In one embodiment, altering includes reducing weights of the assets. In another embodiment, altering includes increasing weights of the assets. In yet another embodiment, weights of some assets can be increased and weights of some assets can be reduced.

In one embodiment, weights of all assets that are common among various documents are not altered. Some assets can be locked or specific as unalterable by document creator, document viewer, account holder of the document repository or of the web service or of the folder, and any other person or entity or application having rights to do so. For example, if the document is a report card then the names of the subject, the logo of the school etc. can be locked or specified as unalterable. The process of marking assets as locked or specific can also be automated. For example, based on the category, i.e. report card, of the document a predefined template indicating what all assets need to be locked can be identified and such assets can be automatically marked as unalterable.

In another embodiment, the assets that are of higher importance are allotted a higher weight initially. The higher weight ensures that the assets of higher importance end up with higher weight even after alteration. The assets can be specified as assets of higher importance by document creator, document viewer, account holder of the document repository or of the web service or of the folder, and any other person or entity or application having rights to do so. For example, if the document is a report card then the names of the subject, the logo of the school etc. can be specified as assets of the higher importance. The process of marking assets as the assets of higher importance can also be automated. For example, based on the category, i.e. report card, of the document a predefined template can be used to identify what all assets are of higher importance and such assets can be automatically assigned higher weights.

If there are more documents then step 512 can be performed for other documents too.

At step 514, the thumbnail for the first document is generated using the assets having weights greater than the threshold. Various ways, as also described herein, can be used for generating the thumbnail. The thumbnails are stored for rendering or for later use. Thumbnails of various sizes for different types of user devices are generated.

In some embodiments, the thumbnail includes at least one asset that is common between the first document and the second document.

If there are more documents then step 514 can be performed for other documents too.

The procedure stops at step 516.

Figure 6:
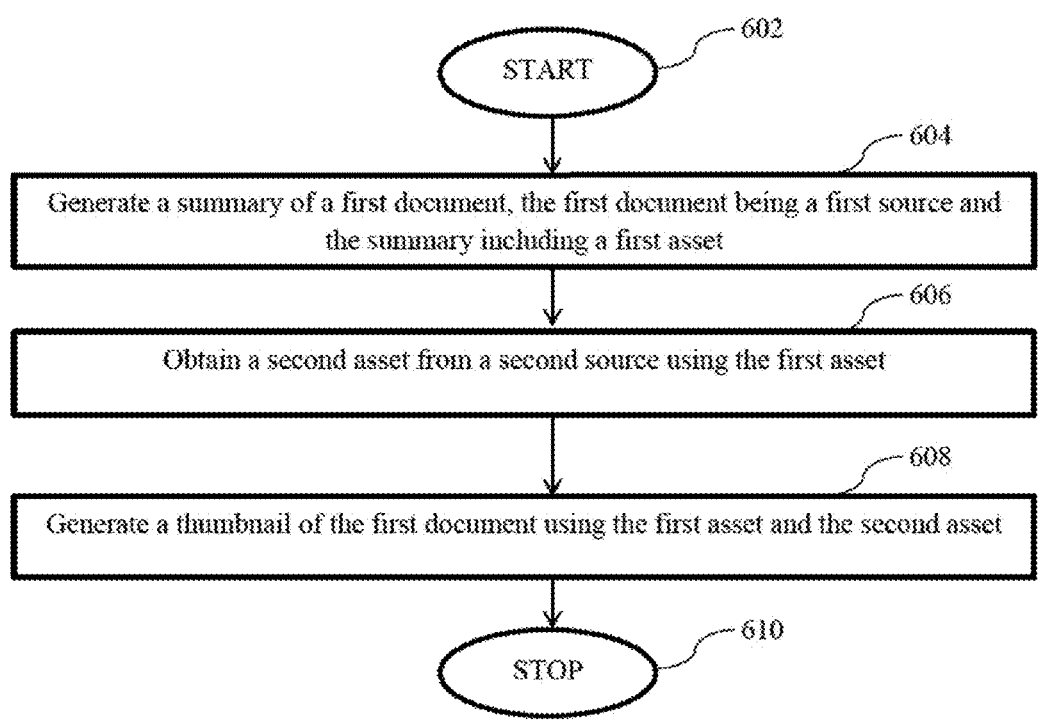
FIG. 6 is a flowchart of a procedure for generating thumbnails of documents, according to one or more embodiments.

FIG. 6 is a flowchart of a procedure 600 for generating thumbnail of documents by an electronic device, for example the apparatus 202 of FIG. 1, according to one embodiment. In illustrated embodiment, the documents include a first document and the first document is referred to as the first source.

The procedure starts at step 602 and proceeds to step 604.

At step 604, a summary of the first document is generated. For generating the summary, a first asset of the first document is identified. The assets are extracted from the first document, the weights are assigned to the extracted assets and then the assets having weights greater than the threshold are identified as the first asset using the procedure as described in FIG. 3. The first asset includes one or more assets and is indicative of the summary of the first document. Various other technologies then that described here can also be used to generate the summary of the first document.

At step 606, a second asset is obtained from a second source using the first document or the first asset or the summary. The second source is a source other than the first document. In one embodiment, examples of the second source include, but are not limited to, a public document repository, a private document repository, the document repository in which the first document is present, a second document present in the document repository in which the first document is present but has a type different than the first document, a public portal, a private portal, a social networking portal or website, or any other publicly or privately available source of content. Examples of the similar types of the documents include, but are not limited to, two report cards, two credit card bills etc. The similarity can be determined based on various existing techniques that provide similarity scores or various other techniques for determining similarity. If the similarity score or the similarity is within a desired range then the documents are of similar types. Two documents that are not of similar types are different types of documents.

A search is performed in the second source using the assets of the first document. In one scenario, one or more assets of the first document are used to perform the search while in other scenario, only the first asset (i.e. the summary) is used to perform the search. Various existing ways of performing the search can be used, for example keyword criteria based search, phrase criteria based search, image criteria based search etc. Assets, from the second source, that match search criteria are determined as the second asset (e.g. images). The second asset is related to the first document because the second asset matches the search criteria which in turn is based on the first document. For example, an image (the second asset) of the student is searched using the name (the first asset or asset of the first document or search criteria) of the student, if the image of the student includes the name of the student as metadata. In one scenario, the images that are searched based on the assets of the first document carry weights similar to the respective assets used for searching. For example, if the weight of name of the student is W1 then the weight of the image of the student is also assigned the weight W1. The same weight assignment can be used in scenarios in which a search is performed based on the first asset. In another scenario, the weight of the image of the student can be K*W1, where K is a configurable factor based on requirement.

At step 608, the first asset and the second asset are used to generate a thumbnail of the first document. For generating the thumbnail, size of the thumbnail is determined. Sub-sizes within the thumbnail are then allocated to the first asset and the second asset based on the weights of the first asset and the second asset. For example, if the size of the thumbnail is N*N and two relevant assets are identified with weights (e.g. 49 and 51) greater than the threshold (e.g. 48), then each asset is allocated a sub-size of [(N*N)*weight of the asset]/[100]. The threshold also depends on the size of the thumbnail and can be varied based on the size of the thumbnail. For example, bigger size thumbnail for a desktop can be made to include eight assets while lower size thumbnail for a mobile phone can be made to include three assets by varying the threshold.

In some embodiments, duplicities are removed before generating the thumbnail. For example, if an asset A1 of the first asset is used to determine asset B1 of the second asset from the second source then asset A1 is not included in the thumbnail. Instead assets A2 and other assets of the first asset along with asset B1 of the second asset are used to generate the thumbnail. Typically, images are used as images are worth thousand words.

In some embodiments, the second source is the second document of a type similar to the first document. The second document can be included in the same document repository which includes the first document. The assets indicative of summary of the second document are obtained. In one example, the second document is processed to determine the assets. The processing of the second document is performed in a similar way as the processing of the first document. In another example, the assets are fetched or obtained from the document repository, if the assets are already present and stored in the document repository. The assets that are common between the first document and the second document are identified. In one example, all assets that are common between the first document and the second document are identified. The weights of the assets of the first document, that are common between the first document and the second document, are reduced. The assets having weights, after reduction, greater than the threshold are used in generating the thumbnail. In another example, the weights for the images, of the first document, that are common between the first document and the second document are not reduced. Only the weights of the assets other than the images are reduced if such assets are common between the first document and the second document. The assets having weights, after reduction, and the images having weights, without reduction, greater than the threshold are identified as the first asset and used in generating the thumbnail. Similarly, weights of assets of the second document are altered and the assets having weights greater than the threshold are identified as the second asset. In one embodiment, the second asset after such a processing can include zero or more assets. In another embodiment, the second asset after such a processing includes one or more assets.

The procedure stops at step 610.

Figure 7:
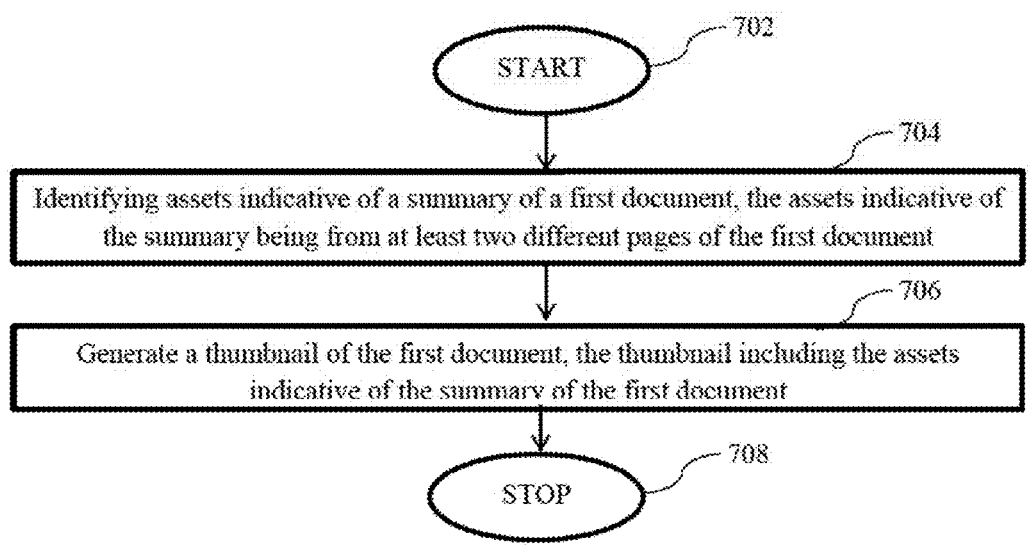
FIG. 7 is a flowchart of a procedure for generating thumbnails of a document in a document repository, according to one or more embodiments.

FIG. 7 is a flowchart of a procedure for generating thumbnails of a document in a document repository, according to one or more embodiments. In illustrated embodiment, the document is a first document.

The procedure starts at step 702 and proceeds to step 704.

At step 704, assets indicative of a summary of the first document are identified. The assets are extracted from the first document, the weights are assigned to the extracted assets and then the assets having weights greater than the threshold are identified as the assets indicative of the summary of the first document. The assets indicative of the summary of the first document are identified using the procedures described in FIG. 3 or FIG. 4. In illustrated embodiment, the assets indicative of the summary of the first document are from at least two different pages of the first document.

At step 706, the thumbnail including the assets indicative of the summary of the first document is generated. Various ways, as also described in FIG. 3 or FIG. 4, can be used for generating the thumbnail.

In some embodiments, a search is performed using the assets of the first document or using the assets indicative of the summary of the first document. The search is performed in a source other than the first document. The source other than the first document is also referred to as the second source. The additional asset identified via the search is used in the thumbnail. The search can be performed using various ways, for example the ways described in FIG. 3 or FIG. 4 or FIG. 5 or FIG. 6.

In one embodiment, the first document is not a video.

In some embodiment, assets are also obtained for a second document. The second document is present in the same documents repository as the first document. The assets that are common between the first document and second document are also identified. The weights of the assets of the first document that are common between the first document and the second document are altered, for example reduced. Various ways as described in FIG. 3 or FIG. 4 or FIG. 5 or FIG. 6 can be used for obtaining assets of the second document, identifying the assets that are common between the first document and the second document, and altering the weights of the assets of the first document that are common between the first document and the second document.

The procedure stops at step 708.

Example Snapshots

Figure 8A:
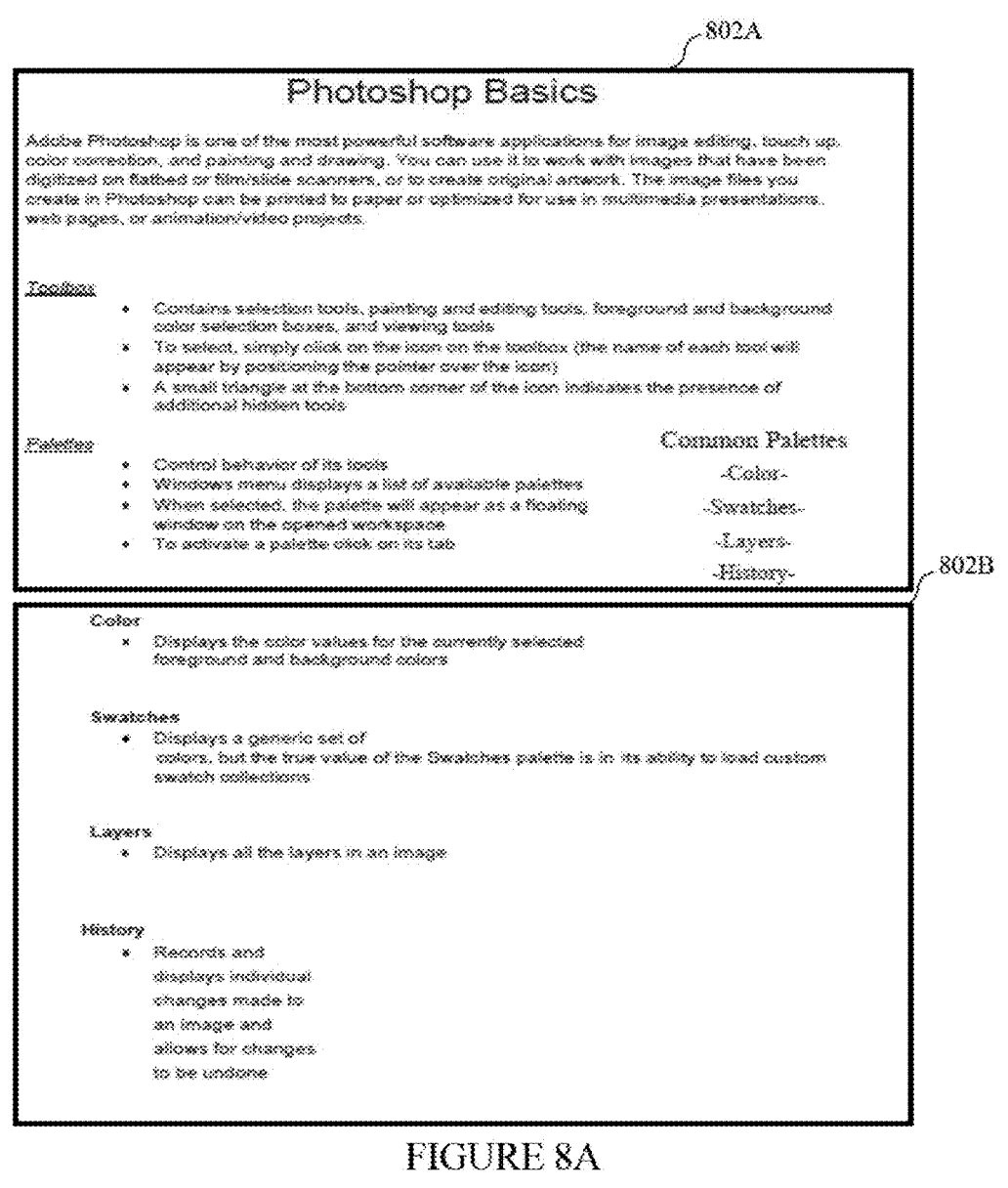
Figure 8B:
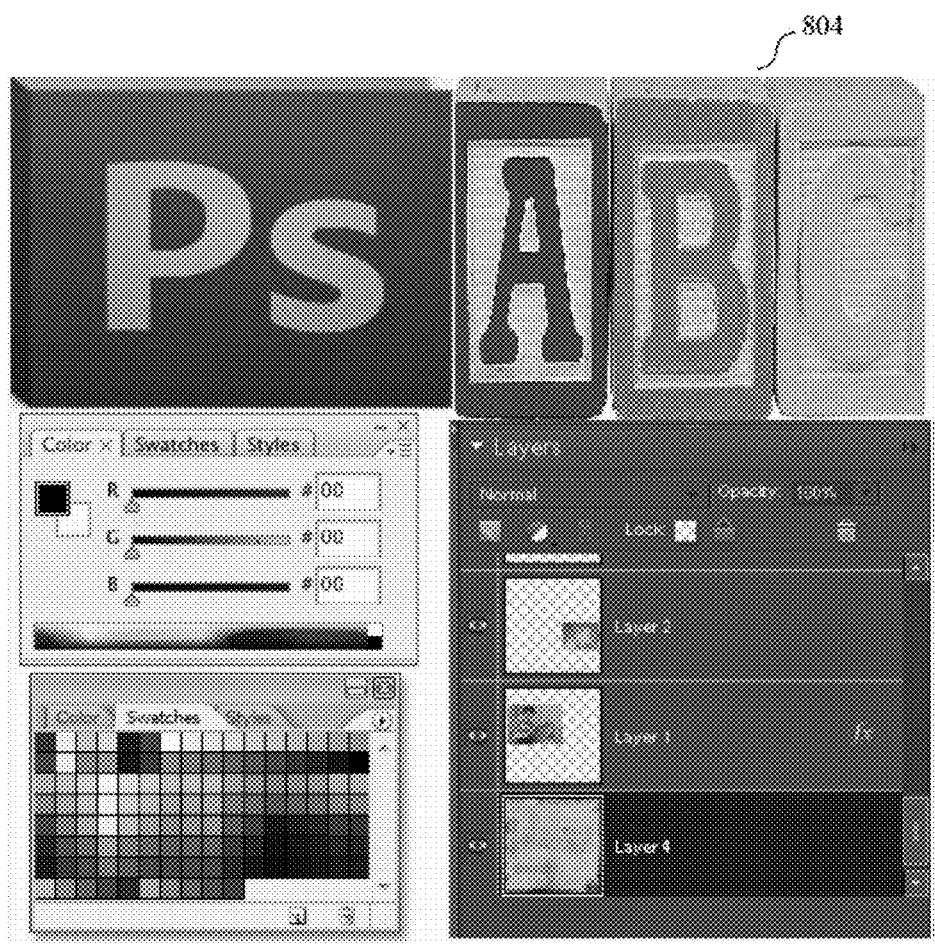

FIG. 8A and FIG. 8B are diagrams illustrating generation of thumbnail of a document, for example a document shown in FIG. 8A, according to one or more embodiments.

In illustrated example, the document does not include images as assets. The document includes two pages, i.e. a page 802A and a page 802B. The document is processed according to the procedure described in FIG. 3. The words identified from the document includes "Photoshop", "color", "layers", "swatches", "palettes" etc. A search is then performed in the document repository including the document to identify images. The identified images have weights greater than the threshold and hence, are used to generate a thumbnail 604 shown in FIG. 6B. The thumbnail 604 includes images identified corresponding to words like "Photoshop", "color", "layers", "swatches".

Figure 9A:
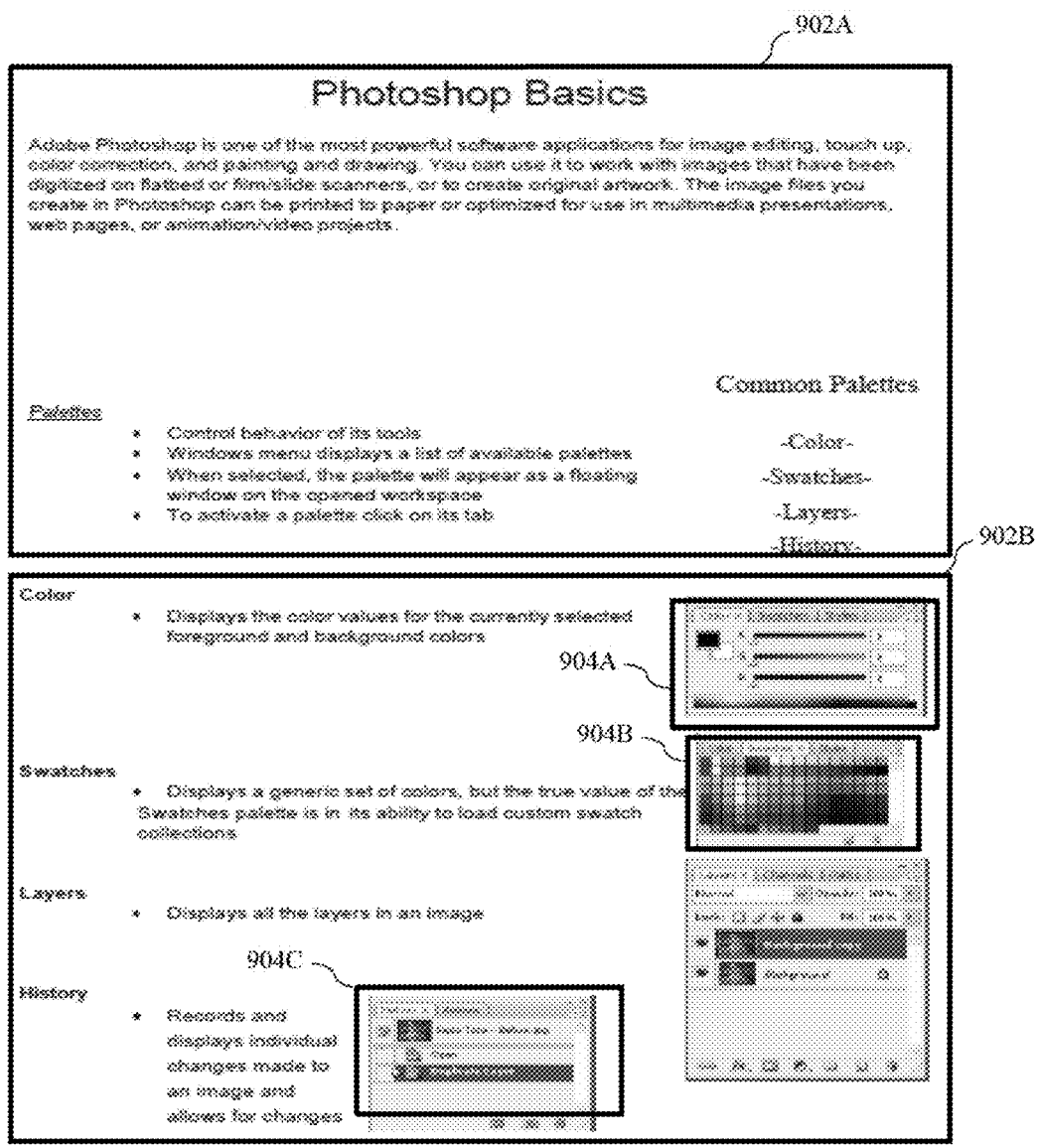
FIG. 9A and FIG. 9B are diagrams illustrating generation of thumbnail of a document, according to one or more embodiments.
Figure 9B:
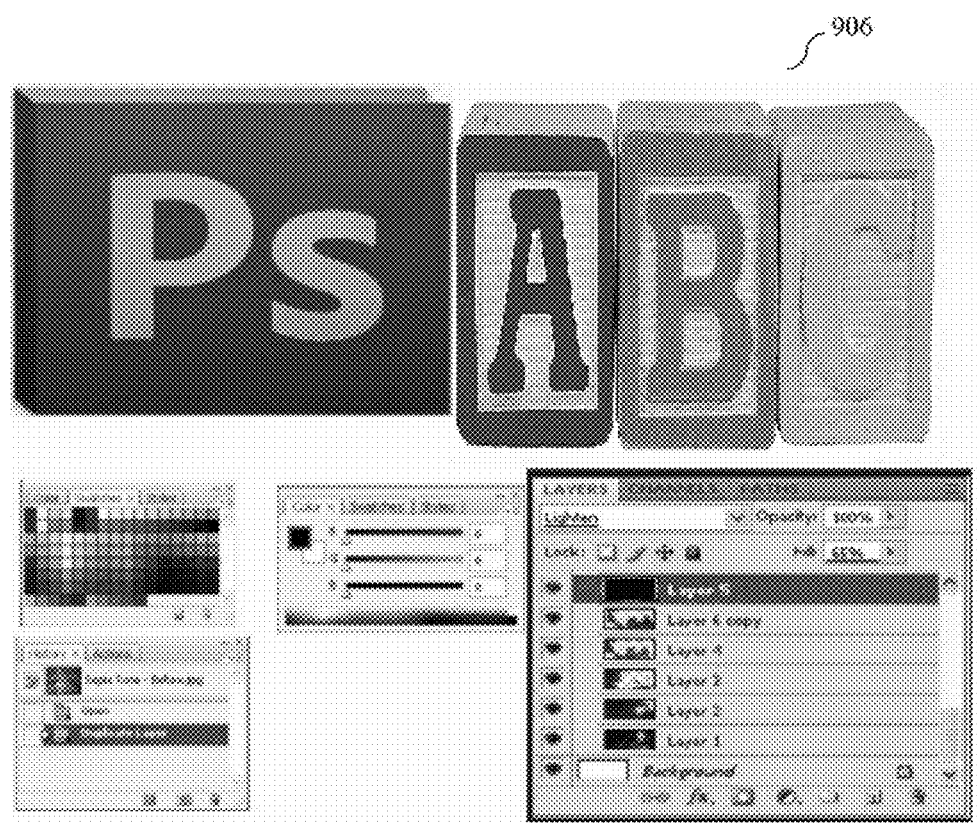

FIG. 9A and FIG. 9B are diagrams illustrating generation of thumbnail of a document, for example a document shown in FIG. 9A, according to one or more embodiments.

In illustrated example, the document includes images and words among other assets. The document is processed according to the procedure described in FIG. 4. The words identified from the document 902 includes "Photoshop", "color", "layers", "swatches", "palettes" etc. The images identified from the document include an image 904A, an image 904B, and an image 904C. In illustrated example, a search is also performed in the document repository including the document to identify additional images. The assets having weights greater than the threshold are used to generate a thumbnail 906 shown in FIG. 8B. The thumbnail 906 includes additional images identified corresponding to words like Photoshop etc. and also the images, e.g. the image 902A etc., from the document.

Figure 10A:
FIG. 10A, FIG. 10B and FIG. 10C are diagrams illustrating generation of thumbnails of documents in a document repository, according to one or more embodiments.
Figure 10B:
Figure 10C:
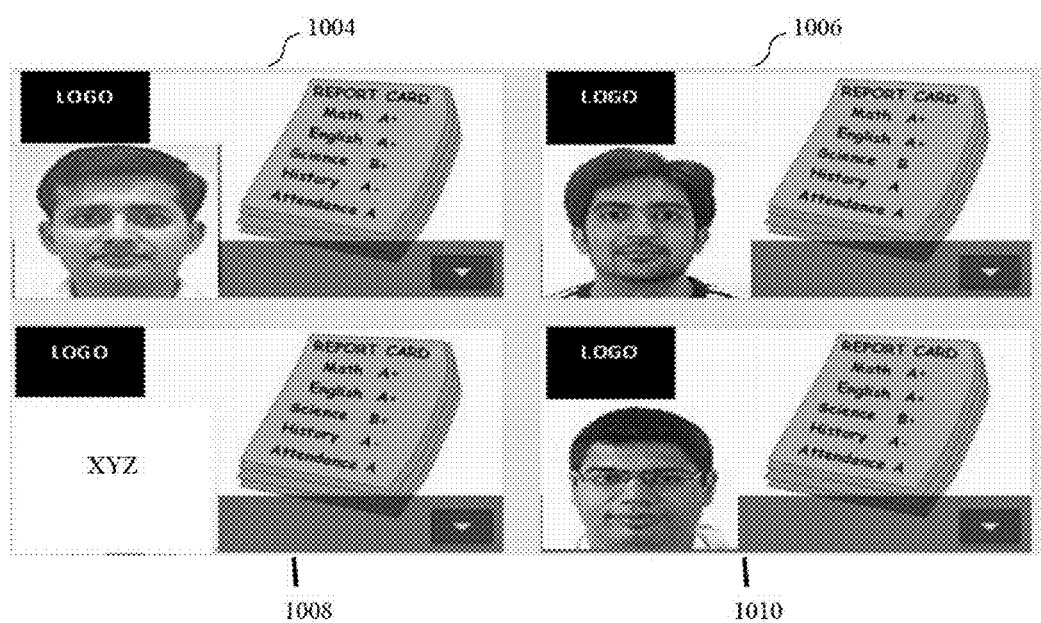

FIG. 10A, FIG. 10B and FIG. 10C are diagrams illustrating generation of thumbnails of documents, for example a document 1002a and a document 1002B in a document repository, according to one or more embodiments.

In illustrated example, the document 1002A and the document 1002B includes images and words among other assets. The documents are processed according to the procedure described in FIG. 5. The words identified from the document 1002A include name of the student "Anmol Dhawan", type of document "Report card", name of subjects such as "Math", "Science" etc. The images identified from the document 1002A include school logo. In illustrated example, a search is also performed in the document repository including the document 1002A to identify additional image such as photograph of "Anmol Dhawan". Similarly, the words and the images are identified for other documents present in the document repository. The words, i.e. "Report card", and the images, i.e. school logo, are identified as assets that are common between the document 1002A and the document 1002B. The names of the subjects such as "Math" etc. are the words that are locked or are the words having higher initial weights, i.e. the words of higher importance. The other documents include the document 1002B, i.e. report card of "Ashish Duggal", and two more report cards (not shown in FIG. 10A and FIG. 10B). The assets having weights greater than the threshold are used to generate a thumbnail 1004 for the document 1002A as shown in FIG. 10C. The thumbnail 1004 includes additional image of "Anmol Dhawan", the image of the document 1002A such as the school logo, the words of higher importance such as names of the subjects, and the words having weights greater than the threshold such as grades obtained in the subjects. Similarly, a thumbnail 1006 is generated for the document 1002B. Thumbnails 1008 and 1010 are the thumbnails of the other two report cards that are not shown in FIG. 10A and FIG. 10B. Thumbnail 1008 does not include an image of the student because the image was not found and hence, the thumbnail 1008 includes name of the student instead.

In some embodiments, any thumbnail of the thumbnail 804, the thumbnail 806, the thumbnail 808, and the thumbnail 810 can include name of the student instead of the image of the student if the image is not available, or if the application, the web service, or the cloud service is configured to provide higher weights to the words than the images.

The embodiments of the present invention may be embodied as procedures, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution apparatus. In the context of this document, a computer-usable or computer-readable medium may be any medium that can contain, store, communicate, propagate, or transport the program for use by or in connection with the instruction execution apparatus, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Examples of the computer-usable or computer-readable medium include, but are not limited to, an electronic, magnetic, optical, electromagnetic, infrared, or semiconductor apparatus, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like or in scripting language, such as Perl, Python, PHP, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The procedures described herein may be implemented in software, hardware, or a combination thereof, in different embodiments. In addition, the order of procedures may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance.

In the foregoing detailed description, numerous specific details are set forth to provide a thorough understanding of claimed subject matter. However, it will be understood by those skilled in the art that claimed subject matter may be practiced without these specific details. For example, the claimed subject matter may be practiced by using different gestures or icons than that described. In other instances, procedures or apparatuses that would be known by one of ordinary skill have not been described in detail so as not to obscure claimed subject matter.

Some portions of the detailed description are presented in terms of algorithms or symbolic representations of operations on binary digital signals stored within a memory of a specific apparatus or specific electronic device or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Unless specifically stated otherwise, as apparent from the following discussion, it is appreciated that throughout this specification discussions utilizing terms such as "processing," "displaying," "receiving," "providing" or the like refer to actions or processes of a specific apparatus, such as a special purpose computer or a similar special purpose electronic device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic device.

Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A system comprising:
   at least one processor; and
   at least one non-transitory computer readable storage medium storing instructions that, when executed by the at least one processor, cause the system to:
   identify a first document from a document repository, wherein the first document comprises a first source;
   assign weights to assets of the first document;
   identify at least one asset of the first document having a weight greater than a threshold as a first asset of the first document;
   generate a summary of the first document, the summary comprising the first asset;
   search a second source based on the first asset;
   identify, from the second source, at least one asset related to the first asset as a second asset of the second source; and
   generate a thumbnail of the first document comprising the first asset of the first document and the second asset of the second source.

2. The system as claimed in claim 1, wherein the first asset and the second asset comprise at least one of a word, image, video, or sentence.

3. The system as claimed in claim 1, wherein identifying the second asset of the second source comprises:
   assigning weights to assets of the second source; and
   identifying at least one asset of the second source having a weight greater than the threshold as the second asset of the second source.

4. The system as claimed in claim 1, wherein the threshold comprises a frequency of occurrences of a word or sentence greater than a predefined number.

5. The system as claimed in claim 1, wherein the instructions, when executed by the at least one processor, cause the system to generate the thumbnail by performing steps comprising:
   determining a size of the thumbnail; and
   allocating sub-sizes within the thumbnail to the first asset and to the second asset.

6. The system as claimed in claim 5, wherein the threshold is based on the size of the thumbnail.

7. The system as claimed in claim 1, further comprising instructions that, when executed by the at least one processor, cause the system to:
   identify assets that are common between the first document and the second source; and
   alter the weights assigned to the assets of the first document that are common between the first document and the second source.

8. The system as claimed in claim 7, further comprising instructions that, when executed by the at least one processor, cause the system to:
   assign weights to assets of the second source;
   alter the weights assigned to the assets of the second source that are common between the first document and the second source; and
   identify assets of the second source having weights greater than the threshold as the second asset of the second source.

9. A non-transitory computer readable medium storing instructions that, when executed by at least one processor causes the at least one processor, cause a computer system to perform step for generating thumbnails comprising:
   identifying a first document from a document repository, wherein the first document comprises a first source;
   assigning weights to assets of the first document;
   identifying at least one asset of the first document having a weight greater than a threshold as a first asset of the first document;
   searching a second source based on the first asset;

identifying, from the second source, at least one asset related to the first asset as a second asset of the second source; and generating a thumbnail of the first document comprising the first asset of the first document and the second asset of the second source.

10. The non-transitory computer readable medium as claimed in claim 9, wherein identifying the second asset of the second source comprises:

assigning weights to assets of the second source;

identifying at least one asset of the second source having a weight greater than the threshold as the second asset of the second source.

11. The non-transitory computer readable medium as claimed in claim 9, wherein the threshold comprises a frequency of occurrences of a word or sentence greater than a predefined number.

12. The non-transitory computer readable medium as claimed in claim 9, further comprising instructions that, when executed by the at least one processor, cause the computer system to perform the steps of:

identifying assets that are common between the first document and the second source; and altering the weights assigned to the assets of the first document that are common between the first document and the second source.

13. The non-transitory computer readable medium as claimed in claim 12, further comprising instructions that, when executed by the at least one processor, cause the computer system to perform the steps of:

assigning weights to assets of the second source;

altering the weights assigned to the assets of the second source that are common between the first document and the second source; and identifying assets of the second source having weights greater than the threshold as the second asset of the second source.

14. The non-transitory computer readable medium as claimed in claim 9, wherein generating the thumbnail comprises:

determining a size of the thumbnail; and allocating sub-sizes within the thumbnail to the first asset and to the second asset.

15. A method comprising:

identifying, by one or more processors, a first document from a document repository, wherein the first document comprises a first source;

assigning, by the one or more processors, weights to assets of the first document;

identifying, by the one or more processors, at least one asset of the first document having a weight greater than a threshold as a first asset of the first document;

generating a summary of the first document, the summary comprising the first asset, searching, by the one or more processors, a second source based on the first asset;

identifying, by the one or more processors from the second source, at least one asset related to the first asset as a second asset of the second source; and generating a thumbnail of the first document comprising the summary of the first document and the second asset of the second source.

16. The method as claimed in claim 15, wherein identifying the second asset of the second source comprises:

assigning, by the one or more processors, weights to assets of the second source;

identifying, by the one or more processors, at least one asset of the second source having a weight greater than the threshold as the second asset of the second source.

17. The method as claimed in claim 15, wherein the threshold comprises a frequency of occurrences of a word or sentence greater than a predefined number.

18. The method as claimed in claim 15, wherein generating the thumbnail comprises:

determining a size of the thumbnail; and allocating sub-sizes within the thumbnail to the summary and to the second asset.

19. The method as claimed in claim 15, further comprising:

identifying, by the one or more processors, assets that are common between the first document and the second source; and altering the weights assigned to the assets of the first document that are common between the first document and the second source.

20. The method as claimed in claim 19, further comprising:

assigning, by the one or more processors, weights to assets of the second source;

altering, by the one or more processors, the weights assigned to the assets of the second source that are common between the first document and the second source; and identifying, by the one or more processors, assets of the second source having weights greater than the threshold as the second asset of the second source.

* * * * *